US012014693B2

(12) United States Patent
Huijsing

(10) Patent No.: US 12,014,693 B2
(45) Date of Patent: Jun. 18, 2024

(54) ADJUSTABLE DISPLAY

(71) Applicant: B/E Aerospace, Inc., Winston Salem, NC (US)

(72) Inventor: Hans Huijsing, IJsselstein UT (NL)

(73) Assignee: B/E AEROSPACE, INC., Winston Salem, NC (US)

(*) Notice: Subject to any disclaimer, the term of this patent is extended or adjusted under 35 U.S.C. 154(b) by 0 days.

(21) Appl. No.: 17/831,917

(22) Filed: Jun. 3, 2022

(65) Prior Publication Data

US 2022/0415270 A1 Dec. 29, 2022

(30) Foreign Application Priority Data

Jun. 28, 2021 (EP) .................................... 21181998

(51) Int. Cl.
*G09G 3/34* (2006.01)

(52) U.S. Cl.
CPC ... *G09G 3/3406* (2013.01); *G09G 2320/0626* (2013.01); *G09G 2360/144* (2013.01)

(58) Field of Classification Search
CPC ......... G09G 2354/00; G09G 2360/144; G09G 2320/0626
See application file for complete search history.

(56) References Cited

U.S. PATENT DOCUMENTS

| | | | | |
|---|---|---|---|---|
| 10,049,623 | B2 * | 8/2018 | Sun | G09G 3/3406 |
| 10,129,954 | B2 | 11/2018 | Despres | |
| 2019/0308728 | A1 | 10/2019 | Mckee | |
| 2020/0068122 | A1 | 2/2020 | Jang | |
| 2020/0122802 | A1 | 4/2020 | Bradlow et al. | |
| 2020/0248907 | A1 * | 8/2020 | Klok | B64D 11/04 |
| 2020/0310735 | A1 | 10/2020 | Dean-Bhiyan et al. | |
| 2020/0388033 | A1 * | 12/2020 | Matlock | G06V 10/26 |
| 2021/0358453 | A1 * | 11/2021 | Sun | G09G 5/10 |

FOREIGN PATENT DOCUMENTS

| | | | |
|---|---|---|---|
| GB | 2571986 | B | 9/2020 |
| KR | 20190108466 | A | 9/2019 |

OTHER PUBLICATIONS

Galley Apparatus Adrian Berry et al. Sep. 18, 2019 (Year: 2019).*
Abstract for KR20190108466 (A), Published: Sep. 24, 2019, 1 page.
European Search Report for Application No. 21181998.2, dated Dec. 10, 2021, 8 pages.

* cited by examiner

*Primary Examiner* — Van N Chow
(74) *Attorney, Agent, or Firm* — CANTOR COLBURN LLP

(57) ABSTRACT

A system includes a display, and a central programming unit, wherein the central programming unit is configured to automatically adjust a brightness of the display based on factors of the environment surrounding the display.

9 Claims, 3 Drawing Sheets

ADJUSTABLE DISPLAY

CROSS REFERENCE TO RELATED APPLICATIONS

This application claims priority to European Patent Application No. 21181998.2 filed Jun. 28, 2021, the entire contents of which is incorporated herein by reference.

FIELD OF THE INVENTION

The present disclosure relates an adjustable light emitting interface such as an LED display, or similar. In particular, the present disclosure relates to an adjustable LED display that may be used on electrical appliances on an aircraft for example, an aircraft oven, chiller etc.

BACKGROUND

Various electrical appliances, for example aircraft galley inserts, include light emitting interfaces such as LED displays. In particular, various electrical appliances, such as convection ovens, microwave ovens, chiller cabinets, refrigerators, hot water dispensers and beverage makers may be used in an aircraft galley. The galley apparatus may include LED displays to display useful information to the cabin crew and to provide a status of the galley apparatus. For example, in the example of aircraft ovens, a status bar on an LED display can inform the cabin crew of whether food has completed cooking or whether there is a period of time left for cooking.

Electrical appliances on aircraft include LED displays with a fixed brightness which can cause stress to crew members' eyes if the display is too bright with respect to the ambient light around the appliance. Further, the fixed brightness could cause light pollution for cabin crew before, during or after flight.

SUMMARY OF THE INVENTION

There is provided a system that includes a display and a central programming unit. The central programming unit is configured to automatically adjust a brightness of the display based on factors of the environment surrounding the display.

The system may further include sensing means configured to analyse the factors of the environment surrounding the display.

The sensing means may include a light sensor. The central programming unit may be configured to determine an intensity of light from the light sensor and, when the central programming unit determines that the intensity of light is above a predetermined threshold, the central programming unit increases the brightness of the display. When the central programming unit determines that the intensity of light is below the pre-determined threshold, the central programming unit may decrease the brightness of the display.

Optionally, or additionally, the sensing means may be a proximity sensor. The proximity sensor may be configured to indicate to the central programming unit that a user is in proximity of the proximity sensor, and wherein, in response to a user being detected in proximity to the proximity sensor, the central programming unit may increase the brightness of the display.

Optionally, or additionally, the sensing means may comprise one or more status LEDs that are configured to determine the intensity of light surrounding the display. The central programming unit, in response to the determined intensity of light, may increase or decrease the brightness of display.

The system may further include a wired interface connected to a wired network. The wired network may be configured to send commands to the central programming unit to increase or decrease the brightness of the display. Optionally, or additionally, the system may further include a wireless interface connected to a wireless network. The wireless network may be configured to send commands to the central programming unit to increase or decrease the brightness of the display.

There is also provided an aircraft oven comprising the above mentioned system.

There is further provided an aircraft galley comprising the aircraft oven described above.

A method is provided that includes providing a display and providing a central programming unit, wherein the central programming unit automatically adjusts a brightness of the display based on factors of the environment surrounding the display.

The method may further include sensing means that may be configured to analyse the factors of the environment surrounding the display.

The sensing means may include a light sensor. The central programming unit may determine an intensity of light from the light sensor and, when the central programming unit determines that the intensity of light is above a predetermined threshold, the central programming unit may increase the brightness of the display, and wherein, when the central programming unit determines that the intensity of light is below the pre-determined threshold, the central programming unit may decrease the brightness of the display.

Optionally, or additionally, the sensing means may be a proximity sensor. The proximity sensor may indicate to the central programming unit that a user is in proximity of the proximity sensor, and wherein, in response to a user being detected in proximity to the proximity sensor, the central programming unit may increase the brightness of the display.

Optionally, or additionally, the sensing means may be one or more status LEDs that determine the intensity of light surrounding the display, and wherein the central programming unit, in response to the determined intensity of light, may increase or decrease the brightness of display.

The method may further include a wired interface connected to a wired network. The wired network may be configured to send commands to the central programming unit to increase or decrease the brightness of the display. Optionally, or additionally, the method may further include a wireless interface connected to a wireless network. The wireless network may be configured to send commands to the central programming unit to increase or decrease the brightness of the display.

DETAILED DESCRIPTION

Figure 1:
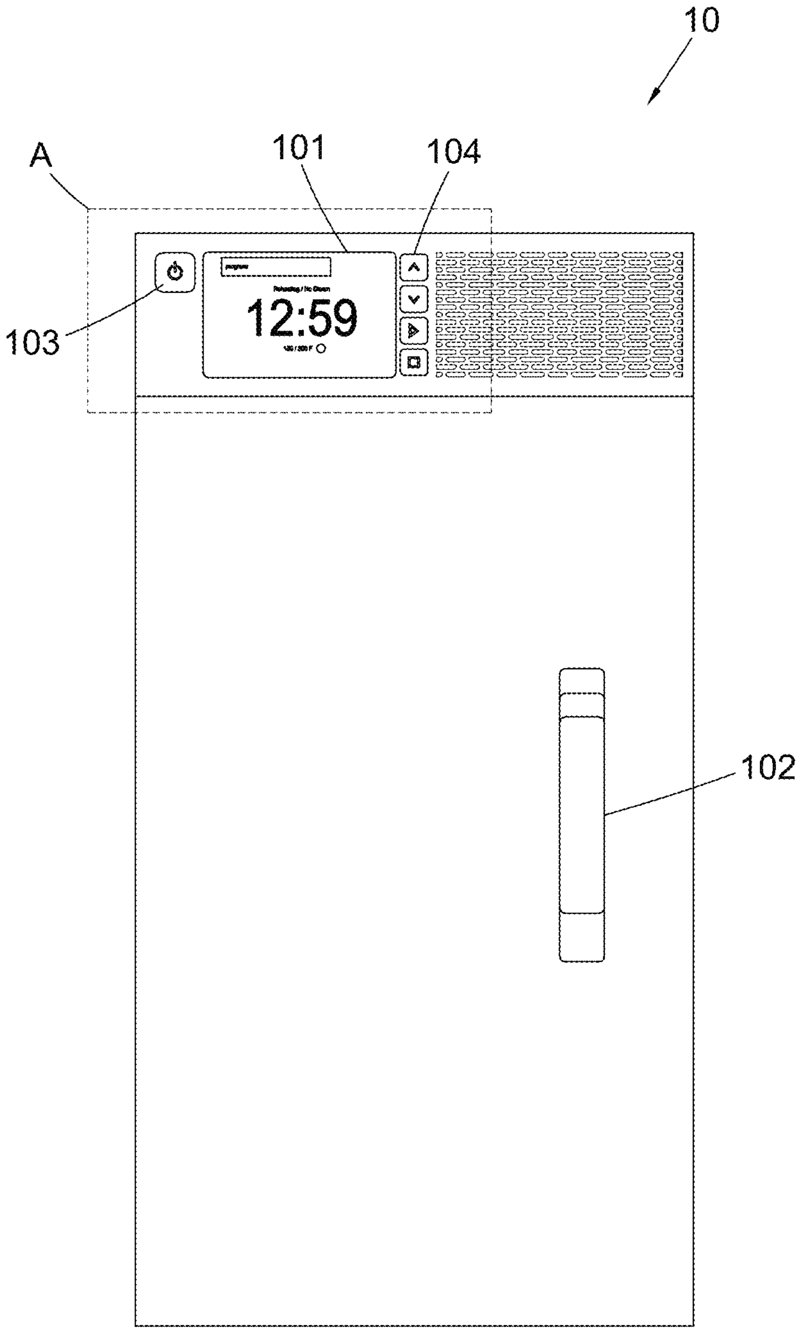
FIG. 1 shows an example of an oven having a display.

An example of an oven 10 is shown in FIG. 1. The oven 10, for example, is provided to cook and/or heat meals on, for example, an aircraft. As can be seen in this Figure, the oven 10 may include generally a control and display area A (shown in more detail in FIG. 2). The control and display area A may include a light emitting interface such as a display 101, a door handle 102, a power on/off switch 103, and a control panel 104. The display 101 is configured to show an operating status of the oven. For example, the display 101 can display the time remaining and/or the progress of the cooking. Although the example of FIG. 1 shows an display 101 in an oven 10, it is understood that the display 101 may be provided in other electrical appliances, such as microwave ovens, chiller cabinets, refrigerators, hot water dispensers and beverage makers. As an example, the display 101 is an LED display, or the like.

Figure 2:
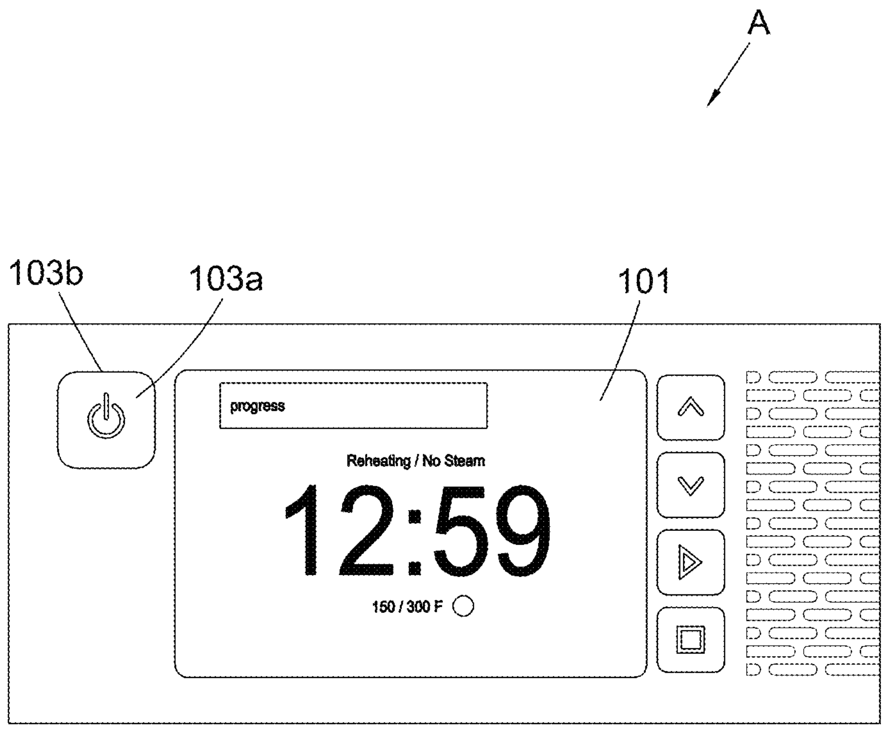
FIG. 2 shows an example of a display of an oven.

The control and display area A is shown in more detail in FIG. 2. As can be seen in this Figure, the control and display area A may include the display 101, a power on/off switch 103*a*, an oven status light 103*b* integrated in the power on/off switch 103*a*, and control switches 104*a*, 104*b*, 104*c*, 104*d*.

As mentioned above, the display 101 may include status reports of the cooking and/or heating of the items provided in the oven. For example, the display 101 may include a progress bar, an indication of the time remaining, an indication of the oven setting (e.g. reheating/no steam) and/or temperature setting.

The power on/off switch 103*a* turns the oven on and off. The oven status light 103*b* shows the power status of the oven. For example, a green annular ring indicates that the oven is on, a blue annular ring indicates that the oven is in standby mode, and a yellow annular ring indicates that the oven is in use.

The brightness of the display 101 may be bothersome before, during or after the flight due to the light pollution that is emitted by the display 101. Therefore, it is contemplated that the brightness of the display 101 could be controlled in order to dim or brighten the display 101 based on various factors.

Figure 3:
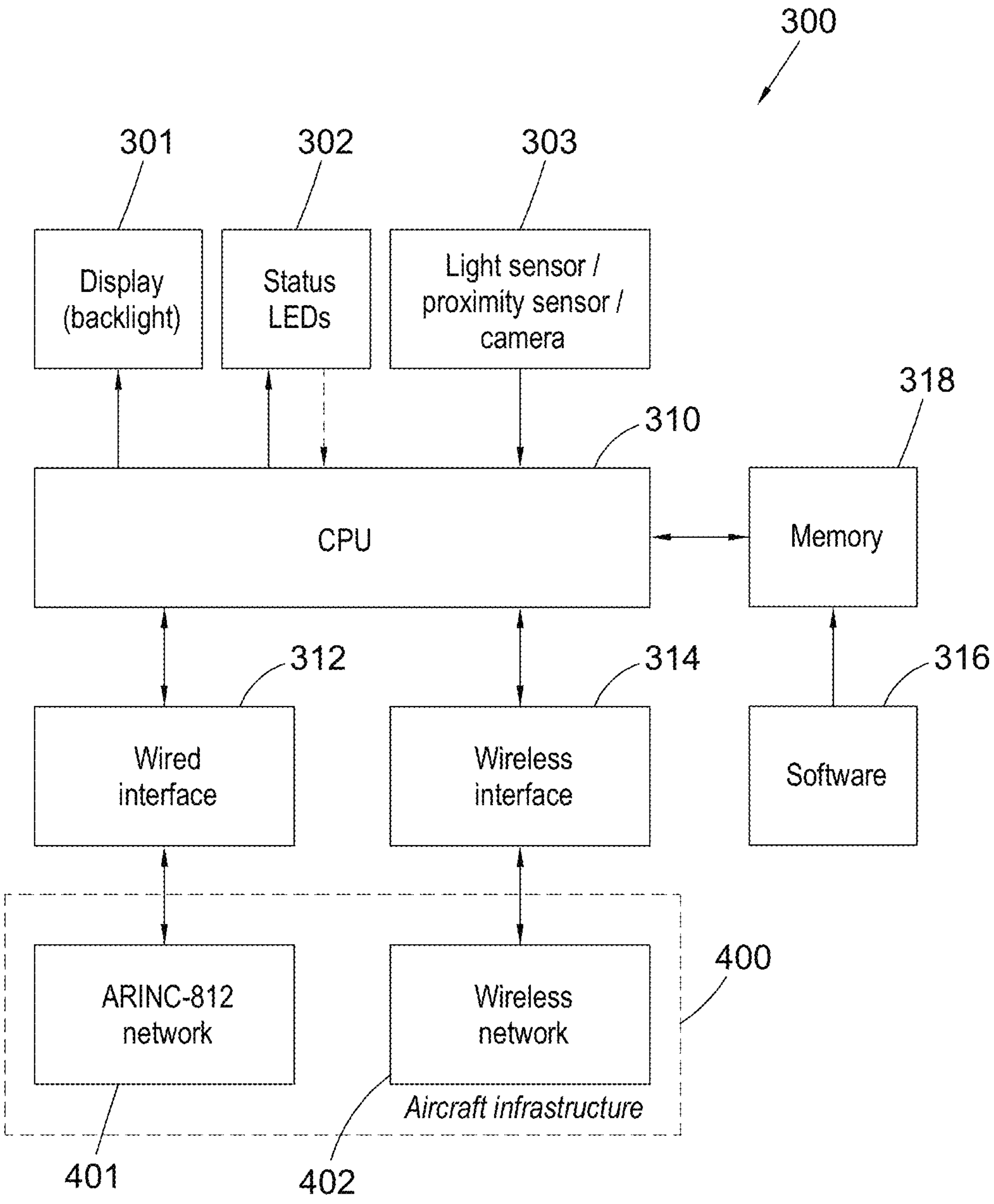
FIG. 3 shows a system in accordance with an example of this disclosure.

A system 300 is shown in FIG. 3 for allowing brightness adjustments of the example display 101 in FIGS. 1 and 2. The system 300 may include a display with a backlight 301, status LEDs 302, sensing means 303, a central programming unit 310, memory 318, software 316, a wired interface 312, a wired network 401, a wireless interface 314 and a wireless network 402. The wired network 401 and wireless network 402 are, as an example, part of an aircraft infrastructure 400.

The system 300 allows for automatic adjustments of the display 301 by analysing various factors of the environment surrounding the display 301. These examples are detailed below. For the purposes of the examples listed below, the term 'bright setting' means that the intensity of the light from the display 301 is visible in daylight conditions and the term 'dim setting' means that the intensity of light of the display is below visible in night-time conditions.

As an example, sensing means 303 may include a light sensor, a proximity sensor and/or a camera. A light sensor would be able to detect the amount of light surrounding the display 301. The concept with the light sensor allows the central programming unit 310 to determine the intensity of light surrounding the display 301. The central programming unit 310 can determine if the intensity of light is above or below a pre-determined threshold. If the central programming unit 310 determines that the intensity of light is above a certain pre-determined threshold, the central programming unit 310 will increase the brightness of the display 301 to a 'bright setting'. If the central programming unit 310 determines that the intensity of light surrounding the display 301 is below a certain pre-determined threshold, the central programming unit 310 will decrease the brightness of the display 301. Therefore, the brightness of the display 301 is automatically adjusted in response to the amount of light surrounding the system 300. The increase and decrease of the brightness of the display 301 may be gradual (e.g. slowly fading from bright to dim, and vice versa)

As another example, which could be used in combination with the light sensor above, the sensing means 303 may include a proximity sensor. The central programming unit 310 may place the display 301 in a dim setting after a pre-set time of non-use, or in response to light conditions as mentioned above. The proximity sensor may detect a person nearby or in front of the proximity sensor. The proximity sensor then indicates to the central programming unit 310 that a person is within the area of the proximity sensor, which then, in turn, increases the brightness of the display 301 to a bright setting. The proximity sensor therefore allows the display 301 to light up ready for a user to use. The proximity sensor also allows for contactless operation in that a user could simply wave their hand in front of the display 301 and proximity sensor to view the status on the display 301. For example, this could be a status of cooking time, temperature etc, as described in relation to FIGS. 1 and 2 above.

The proximity sensor may include one or more of the following: passive infrared sensor, ultrasonic detection, infrared range sensors, time-of-flight sensors, light radar, or any other sensor that allows for proximity detection.

In another example, which may also be used in combination with the light sensor and/or the proximity sensor, the sensing means 303 may include a camera. The camera may be configured to determine the intensity of light surrounding the display 301. The camera may further be configured to recognise faces in order to alter the brightness of the display 301 in a similar way to the light sensor and the proximity sensor.

The system 300 may also include, alone or in combination with the sensing means 303 as discussed above, status LEDs 302 which may also be able to determine the intensity of light surrounding the display 301. For example, the status LEDs 302 may act as a photocell to determine the intensity of light surrounding the display 301. The status LEDs, acting as photocells, can send an indication of the intensity of light to the central programming unit 310. The central programming unit 310 can determine if the intensity of light is above or below a pre-determined threshold. If the central programming unit 310 determines that the intensity of light is above a certain pre-determined threshold, the central programming unit 310 will increase the brightness of the display 301 to a 'bright setting'. If the central programming unit 310 determines that the intensity of light surrounding the display 301 is below a certain pre-determined threshold, the central programming unit 310 will decrease the brightness of the display 301. Therefore, the brightness of the display 301 is automatically adjusted in response to the amount of light surrounding the system 300. The increase and decrease of the brightness of the display 301 may be gradual (e.g. slow fading from bright to dim, and vice versa).

The system 300 includes a memory 318 and software 316. The software 316 contains actions to cause the central programming unit 310 to alter the brightness on the display 301. The memory 316 includes the pre-determined thresholds of intensity of light for comparison with the actual received value from the sensing means 303 and/or status LEDs 302. Further, the memory 316 may include pre-determined settings, for example, levels of brightness in both the bright setting and dim setting.

The system 300 may include a wired interface 312 that is connected to a wired network 401 that may, for example, be a part of an aircraft infrastructure. The wired network 401 may send commands through the wired interface 312 to the central programming unit 310 in order to adjust the display 301. For example, the wired network 401 may provide indications to the central programming unit of the intensity levels of light. The central programming unit 310 can determine if the intensity of light is above or below a pre-determined threshold. If the central programming unit 310 determines that the intensity of light is above a certain pre-determined threshold, the central programming unit 310 will increase the brightness of the display 301 to a 'bright setting'. If the central programming unit 310 determines that the intensity of light surrounding the display 301 is below a certain pre-determined threshold, the central programming unit 310 will decrease the brightness of the display 301. Therefore, the brightness of the display 301 is automatically adjusted in response to the amount of light surrounding the system 300.

The system 300 may include a wireless interface 314 that is connected to a wireless network 402 that may, for example, be a part of an aircraft infrastructure. The wireless network 402 may send commands through the wired interface 312 to the central programming unit 310 in order to adjust the display 301. For example, the wireless network 402 may provide indications to the central programming unit of the intensity levels of light. The central programming unit 310 can determine if the intensity of light is above or below a pre-determined threshold. If the central programming unit 310 determines that the intensity of light is above a certain pre-determined threshold, the central programming unit 310 will increase the brightness of the display 301 to a 'bright setting'. If the central programming unit 310 determines that the intensity of light surrounding the display 301 is below a certain pre-determined threshold, the central programming unit 310 will decrease the brightness of the display 301. Therefore, the brightness of the display 301 is automatically adjusted in response to the amount of light surrounding the system 300.

In an example, the wired network 401 is an ARINC-812 wired network, which is commonly used on aircraft. The ARINC-812 network provides synchronization of various appliances on the aircraft and allows for control of the display 301 in response to, for example, the differing levels of cabin lighting in the aircraft.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. An aircraft galley comprising:

an aircraft oven comprising:

an aircraft oven display;

a central programming unit; and sensing means configured to analyze the factors of an environment surrounding the aircraft oven display;

wherein the central programming unit is configured to automatically adjust a brightness of the aircraft oven display based on factors of the environment in the aircraft surrounding the aircraft oven display;

wherein the sensing means is a proximity sensor;

wherein the proximity sensor is configured to indicate to the central programming unit that a user is in proximity of the proximity sensor; and wherein, in response to a user being detected in proximity to the proximity sensor, the central programming unit increases the brightness of display.

2. The aircraft galley of claim 1, wherein the sensing means comprises a light sensor.

3. The aircraft galley of claim 2, wherein the central programming unit is configured to determine an intensity of light from the light sensor and, when the central programming unit determines that the intensity of light is above a predetermined threshold, the central programming unit increases the brightness of the display, and wherein, when the central programming unit determines that the intensity of light is below the pre-determined threshold, the central programming unit decreases the brightness of the display.

4. The aircraft galley of claim 1, wherein the sensing means comprises one or more status LEDs that are configured to determine the intensity of light surrounding the display, and wherein the central programming unit, in response to the determined intensity of light, increases or decreases the brightness of display.

5. The aircraft galley of claim 1, wherein the aircraft over further comprises:

a wired interface connected to a wired network, wherein the wired network is configured to send commands to the central programming unit to increase or decrease the brightness of the display; or a wireless interface connected to a wireless network, wherein the wireless network is configured to send commands to the central programming unit to increase or decrease the brightness of the display.

6. A method for creating an aircraft oven in an aircraft comprising:

providing an aircraft oven display in the aircraft;

providing a central programming unit, wherein the central programming unit automatically adjusts a brightness of the display based on factors of an environment in the aircraft surrounding display; and providing a sensing means configured to analyze the factors of an environment surrounding the display;

wherein the sensing means is a proximity sensor;

wherein the proximity sensor indicates to the central programming unit that a user is in proximity of the proximity sensor; and wherein, in response to a user being detected in proximity to the proximity sensor, the central programming unit increases the brightness of the display.

7. The method of claim 6, wherein the sensing means comprises a light sensor; and wherein the central programming unit determines an intensity of light from the light sensor and, when the central programming unit determines that the intensity of light is above a predetermined threshold, the central programming unit increases the brightness of the display, and wherein, when the central programming unit determines that the intensity of light is below the pre-determined threshold, the central programming unit decreases the brightness of the display.

8. The method of claim 6, wherein the sensing means comprises one or more status LEDs that determine the intensity of light surrounding the display, and wherein the central programming unit, in response to the determined intensity of light, increases or decreases the brightness of display.

9. The method of claim 6, the method further comprising:

providing a wired interface connected to a wired network, wherein the wired network is configured to send commands to the central programming unit to increase or decrease the brightness of the display; or providing a wireless interface connected to a wireless network, wherein the wireless network is configured to send commands to the central programming unit to increase or decrease the brightness of the display.

* * * * *